No. 661,099. Patented Nov. 6, 1900.
J. B. DAVID.
TIRE FOR VEHICLE WHEELS.
(Application filed Apr. 2, 1900.)
(No Model.)
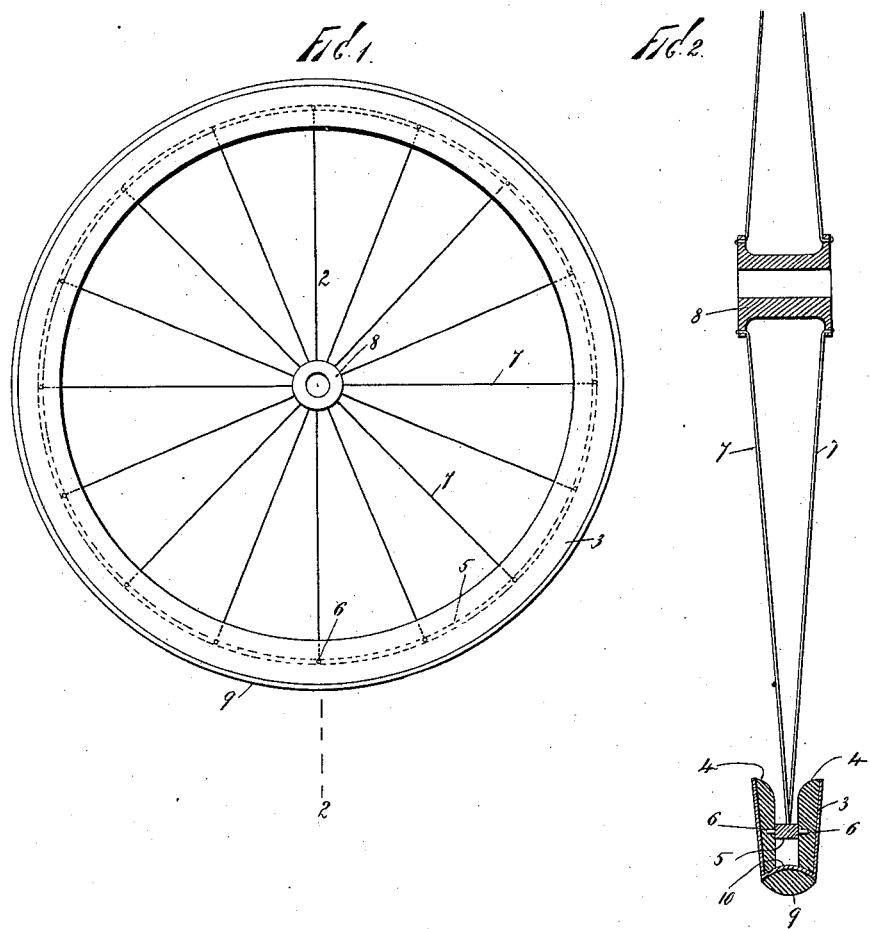
WITNESSES
INVENTOR
James B. David
BY
Edgar Tate & Co.
ATTORNEYS
THE NORRIS PETERS CO., PHOTO-LITHO., WASHINGTON, D. C.

UNITED STATES PATENT OFFICE.

JAMES BAMFORD DAVID, OF NEATH, ENGLAND.

TIRE FOR VEHICLE-WHEELS.

SPECIFICATION forming part of Letters Patent No. 661,099, dated November 6, 1900.

Application filed April 2, 1900. Serial No. 11,204. (No model.)

*To all whom it may concern:*

Be it known that I, JAMES BAMFORD DAVID, a subject of the Queen of Great Britain, residing at Melyn, Neath, in the county of Glamorgan, England, have invented certain new and useful Improvements in Tires for Vehicle-Wheels, of which the following is a full and complete specification, such as will enable those skilled in the art to which it appertains to make and use the same.

This invention relates to tires for vehicle-wheels, and more particularly for the wheels of bicycles, automobiles, and similar vehicles; and the object thereof is to provide a resilient and durable tire not subject to injuries arising from puncture and generally serviceable under all conditions and characters of road-beds.

The invention consists in the construction and arrangement hereinafter specified.

In the accompanying drawings, forming part of this specification, in which like reference characters denote like parts in both views, Figure 1 is a side view of a vehicle-wheel provided with a tire constructed according to my invention, and Fig. 2 an enlarged section thereof on the line 2 2 thereof.

In the practice of my invention I provide an annular rim 3, which is in cross-section of the form shown in Fig. 2, constituting a casing open upon its innermost side and otherwise closed. Within said rim or casing 3 and at opposite sides thereof I arrange continuous annular strips of rubber, rubber and canvas, or other similar yielding substance. Mounted in said strips 4 is an annular band 5, preferably formed of metal and provided with laterally-directed flanges 6, which project into the strips 4, firmly maintaining the band 5 in position. The spokes 7 are connected at their outer ends with the band 5 and at their inner ends with the hub 8, and it is manifest that the weight imposed upon the spokes will be borne resiliently by the resilient strips 4. I further provide an annular resilient tread-piece 9, which is fitted to the periphery or tread 10 of the casing 3, which periphery or tread is preferably slightly concave in formation, and the tread-piece 9 is thus maintained securely in position.

It is manifest that by the construction above described I provide a resilient tire which is indestructible with respect to punctures and which is durable and relatively cheap of manufacture.

I do not limit myself to the specific construction and arrangement of parts herein specified, but reserve the right to vary the same within the scope of my invention.

Having fully described my invention, I claim as new and desire to secure by Letters Patent—

1. The herein-described tire embodying a casing-like rim, resilient elements mounted therein at opposite sides thereof and by which the spokes are directly supported, substantially as shown and described.

2. The herein-described wheel-tire embodying a rim provided at opposite sides with resilient elements, and an annular band carried by said resilient elements and with which the spokes are directly connected, substantially as shown and described.

3. The herein-described vehicle-tire embodying a rim, comprising a tread, and inwardly-directed sides, strips of rubber or similar material connected with the inner walls of said sides, an annular band connected with and supported by said strips of rubber and with which the spokes are directly connected, and a tread-piece arranged exteriorly of said tread, substantially as shown and described.

In testimony that I claim the foregoing as my invention I have signed my name, in presence of the subscribing witnesses, this 20th day of March, 1900.

JAMES BAMFORD DAVID.

Witnesses:
EVAN TAYLOR,
WILLIAM EDGAR ARNOLD EVANS.